United States Patent [19]

Madden

[11] Patent Number: 4,593,714

[45] Date of Patent: Jun. 10, 1986

[54] MANHOLE ASSEMBLY WITH WATER BARRIER

[76] Inventor: Michael J. Madden, 16237 Illinois Ave., Paramount, Calif. 90723

[21] Appl. No.: 622,076

[22] Filed: Jun. 19, 1984

[51] Int. Cl.⁴ .................. F16L 5/00

[52] U.S. Cl. .................. 137/371; 137/314; 52/20; 285/196; 285/205; 404/26

[58] Field of Search .................. 137/363, 364, 371, 312, 137/314; 285/196, 205, 346; 404/26; 52/20, 21

[56] References Cited

U.S. PATENT DOCUMENTS

| | | | |
|---|---|---|---|
| 1,616,098 | 2/1927 | Wells | 137/371 |
| 2,320,187 | 5/1943 | Lawler | 137/314 |
| 2,793,056 | 5/1957 | Graff | 285/196 |
| 3,367,071 | 2/1968 | MacLaren | 52/21 |
| 4,062,376 | 12/1977 | McGrath | 137/312 |
| 4,278,115 | 7/1981 | Briles et al. | 137/312 |
| 4,351,446 | 9/1982 | Madden | 138/89 |
| 4,408,421 | 10/1983 | Pai | 404/26 |
| 4,469,115 | 9/1984 | Rockafellow | 137/370 |

*Primary Examiner*—Martin P. Schwadron
*Assistant Examiner*—Sheri M. Novack
*Attorney, Agent, or Firm*—Phillips, Moore, Lempio & Finley

[57] ABSTRACT

A manhole assembly is attached on a fill pipe for an underground storage tank for gasoline, diesel fuel or other types of toxic chemicals. The manhole assembly comprises a bucket-like body attached on an upper end of the fill pipe and a removable cover mounted on an upper end of the body to selectively expose the fill pipe. At least one annular dam is formed on an upper surface of the body and is adapted to nest within an annular groove formed on an underside of the cover. The dam functions as a barrier to prevent the ingress of water into the body during rainstorms and the like. A combined sealing and cushioning assembly attaches a bottom wall of the body to the fill pipe and a drain connection is provided for selectively communicating an internal chamber of the body with the fill pipe.

17 Claims, 4 Drawing Figures

MANHOLE ASSEMBLY WITH WATER BARRIER

DESCRIPTION

1. Technical Field

This invention relates generally to a manhole assembly and more particularly to a manhole assembly adapted for attachment to a fill pipe for an underground storage tank.

2. Background Art

Many states have enacted laws for the purpose of protecting the environment against pollution of the ground and/or water by the spillage of gasoline in the vicinity of a fill pipe for an underground storage tank for gasoline, diesel fuel or other toxic chemicals. The most common accidental spillage occurs when gasoline or diesel fuel, for example, is delivered to a service station and the storage tank is filled through its fill pipe. Spillages of this type dictate the need for "over-fill protection" whereby the manhole assembly housing the upper end of the fill pipe must be constructed to contain and monitor any such spillage, e.g., resulting from over-fill or small spillages accidentally occurring adjacent to the fill pipe.

In addition to "over-fill protection", it is further desirable to provide a manhole assembly that is impervious to the ingress of water therein, such as the seepage of water into the assembly after a heavy rainfall. For example, should the chamber defined in the body of the manhole assembly inadvertently contain any gasoline, the seepage of water into the chamber will normally fill the chamber and "wash-out" the gasoline onto surrounding ground areas through clearances defined between a cover of the manhole assembly and its body on which the cover is mounted.

In particular, conventional manhole covers are normally seated on a flange formed internally on an upper end of the body with the result that water is enabled to seep past the cover and into the chamber of the manhole assembly. One conventional manhole assembly attempts to solve the water seepage problem by providing an annular sealing gasket between the cover and the seating area of the body and by further providing a special wrench to tighten-down the cover to insure the sealing disiderata. However, should the delivery personnel or service station attendant fail to fully torque-down the cover, water seepage will ensue.

In addition, manhole assemblies of the latter type are expensive to manufacture, including the requirement that the inter-engaging sealing surfaces of the cover and body be machined very accurately to insure a leak-proof seal. Further, damage or the wearing-out of the sealing gasket over an extended period of time will also promote water seepage. Another prior art attempt to solve the water seepage problem constitutes the provision of a pair of engaging O-ring seals between the cover and seating area of the body. However, improper lubrication or neglect to lubricate the seals, as well as the ingress of dirt particles between the seals, will induce the water seepage problem.

Another problem encountered with conventional manhole assemblies is that the body thereof is normally rigidly mounted in concrete and is further rigidly connected to the fill pipe for the underground storage tank. This rigid mounting arrangement can give rise to a leakage problem, as between the body and fill pipe, should the fill pipe move relative to the rigidly mounted body, e.g., as a result of shifting of the storage tank.

DISCLOSURE OF INVENTION

This invention overcomes the above, briefly described problems of the prior art by providing a manhole assembly with a water barrier that eliminates the above-discussed water seepage problem. This invention will materially enhance the quality of the environment by contributing to the maintenance of basic life-sustaining material elements, namely, air, water and soil. In particular, this invention functions to efficiently deter the ingress of rain into the manhole assembly and the spillage of gasoline or other toxic chemicals onto surrounding ground areas.

The manhole assembly, adapted for connection to fill pipe of an underground storage tank, comprises a hollow body defining a chamber therein and terminating at an annular upper surface. An annular cover is removably mounted in overlying relationship on the upper surface of the body and a circumferential dam means is defined between the upper surface of the body and the cover for forming a barrier to prevent the ingress of water radially inwardly over such surface and into the chamber. Thus, any gasoline, diesel fuel or other toxic chemical that may collect in the chamber will not be "washed-out" by water whereby contamination of ground areas surrounding the manhole assembly is prevented.

In another aspect of this invention, a combined sealing and cushioning assembly mounts a bottom wall of the body on the fill pipe for the underground storage tank whereby shifting or other adverse movements of the tank and fill pipe will not damage or destroy the seal between the rigidly mounted body and the fill pipe.

BRIEF DESCRIPTION OF THE DRAWINGS

Other objects and advantages of this invention will become apparent from the following description and accompanying drawings wherein.

BEST MODE OF CARRYING OUT THE INVENTION

Figure 1:
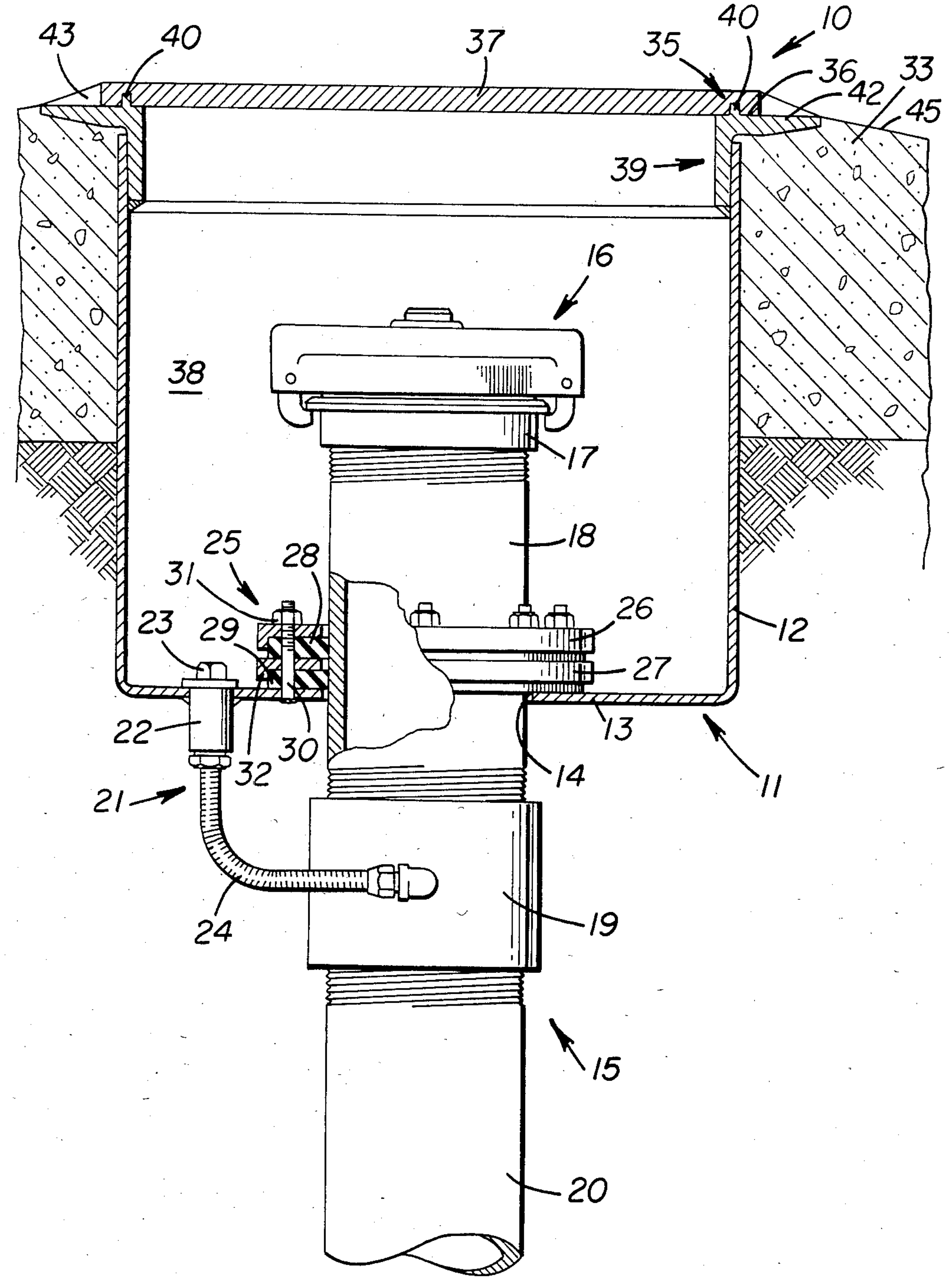
FIG. 1 is a partially sectioned elevational view illustrating a manhole assembly embodiment of this invention, attached to an upper end of a fill pipe for an underground storage tank.
Figure 2:
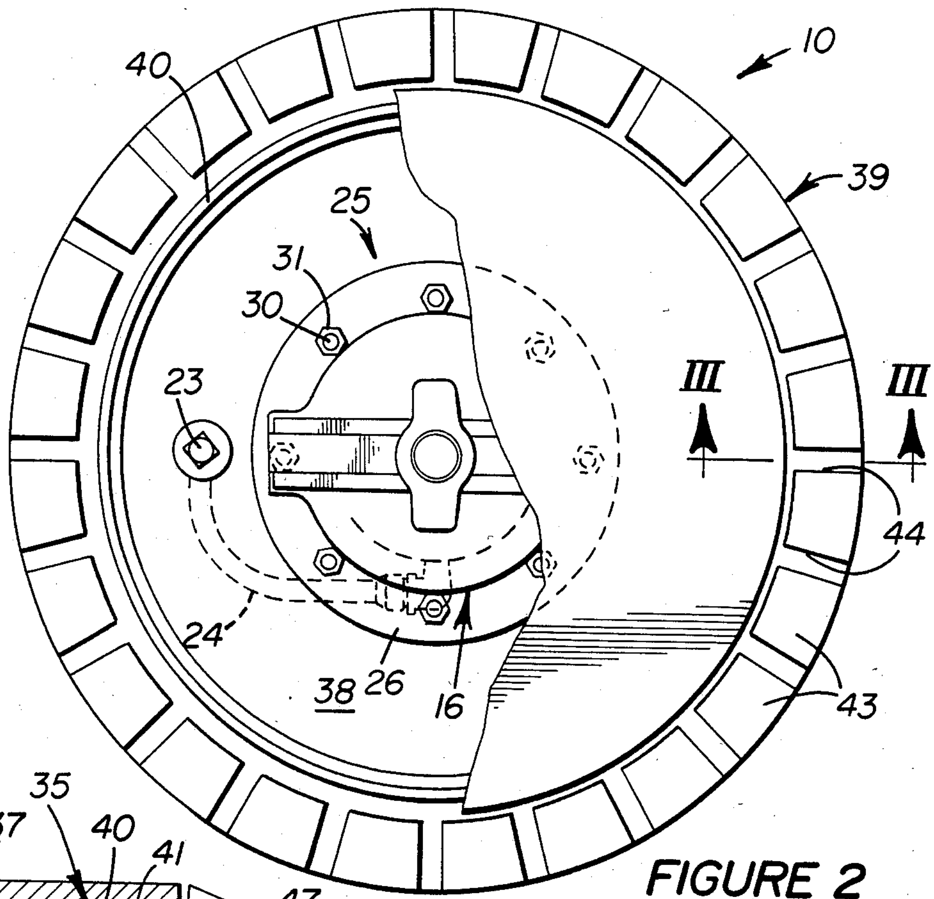
FIG. 2 is a partially section top plan view of the manhole assembly.

FIGS. 1 and 2 illustrate a manhole assembly 10 comprising a cylindrical body 11 having a "bucket" shape. The body includes an upstanding cylindrical steel side wall 12 terminating at its lower end at a horizontally disposed bottom wall 13. As described more fully hereinafter, a circular opening 14 is formed centrally through the bottom wall for purposes of mounting the manhole assembly on a fill pipe assembly 15.

The lower end of the fill pipe assembly is adapted to be attached to an underground storage tank (not shown) in a conventional manner for the purpose of periodically filling the tank with gasoline diesel fuel or other toxic chemical. The upper end of the fill pipe assembly includes a high security fill cap 16 removably mounted thereon for this purpose. The cap may be of the type disclosed in applicant's U.S. Pat. No. 4,351,446, assigned to the assignee of this application. The cap is removably mounted on an annular adapter 17 which is, in turn, threadably mounted on a machined nipple 18.

An annular coupling 19 is threadably mounted between a lower end of nipple 18 and a fill riser or pipe 20, having its lower end attached to an underground storage tank. A drain assembly 21 is suitably connected between bottom wall 13 of the manhole assembly and coupling 19 to periodically drain-off any gasoline, for example, that may accumulate in body 11. The drain assembly comprises a fitting 22 secured to the bottom wall and having its upper end closed by a removable threaded plug 23 and its lower end connected to coupling 19 by a flexible drain hose 24.

One aspect of this invention involves the use of a combined sealing and cushioning assembly 25 for mounting bottom wall 13 of the manhole assembly on fill pipe assembly 15. In particular, conventional manhole assemblies are normally rigidly mounted to a fill pipe for an underground storage tank. Thus, should the storage tank shift or otherwise move to impart such movement to the fill pipe, the seal between the manhole assembly and the fill pipe could be damaged or destroyed. As a result, any gasoline or other toxic chemical inadvertently accumulated in the manhole assembly may leak out and contaminate the surrounding ground areas.

Sealing and cushioning assembly 25 avoids this problem by mounting manhole asembly 10 on fill pipe assembly 15 to absorb and compensate for any shifting or other adverse movements of the storage tank and its attached fill pipe assembly. In the embodiment illustrated in FIG. 1, the sealing and cushioning assembly comprises at least one pair of annular first and second clamping plates 26 and 27, respectively, surrounding machined nipple 18 which is machined to have a smooth and uninterrupted outer surface.

An annular first elastomeric seal 28 is disposed axially between the clamping plates whereas an annular second elastomeric seal 29 is disposed axially between lower, second clamping plate 27 and bottom wall 13 of body 11. A plurality of circumferentially disposed studs 30 each has its lower end suitably secured, such as by welding, to the bottom wall and each stud extends upwardly through aligned holes formed through the clamping plates and seals. The upper end of each stud is threaded and has a compression nut 31 threadably mounted thereon to selectively compress the seals under a predetermined force.

The seals may be composed of any standard elastomeric material, such as a suitable plastic or rubber-based sealing material, preferably exhibiting a durometer hardness in a range from 60 to 70. Each clamping plate has an outer flange 32 formed thereon which overlies an outer edge of a respective seal whereby tightening of nuts 31 will compress the seals and extrude them radially inwardly to form a water-tight seal between nipple 18 and body 11. Thus, the sealing disiderata will be continuously maintained even though the underground storage tank and attached fill pipe assembly shift or otherwise move universally relative to body 11 which is rigidly secured in a concrete base support 33 in a conventional manner.

Figure 3:
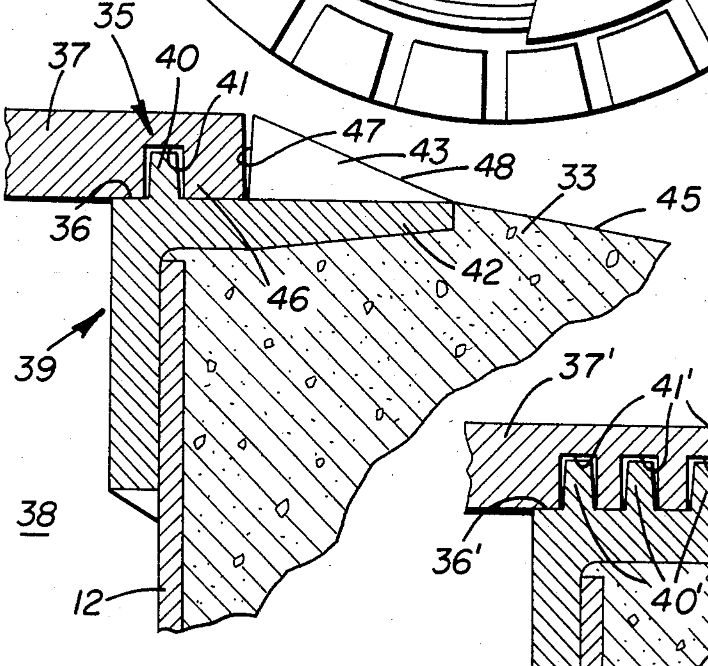
FIG. 3 is an enlarged cross-sectional view through a seating area, including a dam or water barrier, between a cover and an upper end of a body of the manhole assembly, taken in the direction of arrows III—III in FIG. 2.

Referring to FIGS. 1-3, another aspect of this invention is the provision of a dam means 35 circumferentially between an upper surface 36 of body 11 and an annular lid or cover 37 that is mounted in overlying relationship on such surface. As discussed above, a conventional manhole cover will normally be seated on a flange formed internally on an upper end of a corresponding body with the result that water is enabled to seep past the cover and into the chamber of the body. Dam means 35 overcomes this problem by forming a barrier for preventing the ingress of any liquid, such as water, radially inwardly thereover and into a chamber 38 defined in body 11.

Body 11 comprises cylindrical sidewall 12, bottom wall 13 and an annular rim 39 which may be composed of cast-iron. As shown in FIG. 1, the rim may be welded or otherwise suitably secured internally on sidewall 12, such as by rivets or the like. In the embodiment illustrated in FIG. 3, dam means 35 comprises a single annular barrier flange 40 formed in upstanding relationship on a horizontally disposed upper surface 36 of rim 39 and an annular groove 41 formed on an underside of cover 37 with the flange being disposed in nested relationship within the groove.

Flange 40 preferably has an inside diameter selected from the approximate range of from 6.0 inches to 24.0 inches, a height above upper surface 36 selected from the approximate range of from 0.125 inches to 0.50 inches and a width selected from the approximate range of from 0.0625 inches to 0.250 inches. In one commercial embodiment of this invention, the barrier flange had a height of 0.230 inches and a width of 0.125 inches whereas the groove had a height of 0.250 inches and a width of 0.165 inches. In this commercial application of the invention, the groove was rectangular in cross-section whereas the barrier flange was approximately rectangular in cross-section, but exhibited a 3° taper on each side to facilitate casting thereof. In addition, body 11 had a depth approximating eleven inches and an internal diameter approximating twelve inches.

As further illustrated in FIGS. 1-3, rim 39 has an annular mounting flange 42 formed integrally therewith to extend radially outwardly from body 11 and from barrier flange 40. As shown in FIG. 3, upper surface 36 is in part defined on mounting flange 42 and has a plurality of upstanding and circumferentially spaced lugs 43 formed on a radially outer edge thereof to define an opening or slot 44 between each circumferentially adjacent pair of lugs. As more clearly shown in FIG. 1, the portions of upper surface 36, defining the bottom of each groove, is approximately coincident with a sloping upper surface 45 of concrete base support 33.

This arrangement permits water, such as that occasioned by a rainfall, to run-off impervious cover 37 and downwardly away from the manhole assembly over concrete surface 45 which is sloped for this purpose in the manner illustrated. As further shown in FIG. 3, each lug 43 preferably has a generally triangularly shaped cross-section with an upstanding base of the lug being disposed closely adjacent and in opposed relationship to an upstanding outer peripheral surface of an annular centering flange 46, defined on the underside and on the periphery of cover 37 by groove 41. As shown in FIG. 3, the centering flange is thus disposed within a circumferential centering space 47, defined radially between barrier flange 40 and lugs 43 which function as stop means for delimiting lateral movement of cover 36 relative to body 11.

As further shown in FIG. 3, the height of cover 37 is coterminus with the maximum height of lugs 43 to dispose them in flush relationship and an outer surface 48 of each lug is tapered downwardly and outwardly. From the above description and with particular reference to FIG. 3, it can be seen that any water resulting from a rainfall that collects in space 47 will run-off in a rightward direction through openings 44 and over concrete surface 45. Barrier flange 40 will prevent such water from moving leftwardly over surface 36 and into chamber 38.

Figure 4:
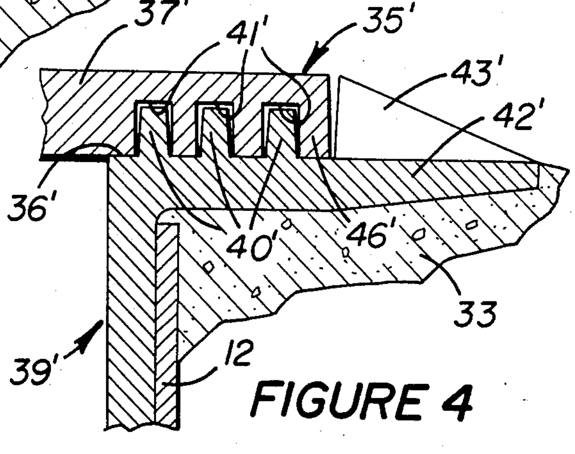
FIG. 4 is a view similar to FIG. 3, but illustrates a modified dam or water barrier.

FIG. 4 is a view similar to FIG. 3 but illustrates a modified dam means 35' wherein a rim 39' has three circumferential barrier flange 40' formed on an upper surface 36' thereof. A plurality of like-numbered grooves 41' are formed on the underside of a modified cover 37' to each receive a respective one of the barrier flanges in nested relationship therein. It should be understood that the number of barrier flanges and accommodating grooves used will depend upon the particular manhole assembly application under consideration. The remaining like-numbered constructions correspond to those illustrated in FIGS. 1-3.

I claim:

1. A manhole assembly adapted for connection to a fill pipe for an underground storage tank comprising a unitary and impervious hollow body defining a chamber therein and terminating at an annular upper surface extending at least generally horizontally from an interior edge to an exterior edge thereof, an annular cover removably mounted in abutted relationship solely on the upper surface of said body and covering said chamber, and dam means solely defined circumferentially, continuously and entirely between the upper surface of said body and an underside of said cover for forming a barrier for preventing the ingress of liquid radially inwardly over said surface and into said chamber, said dam means disposed between the interior and exterior edges of said surface and vertically thereabove and comprising at least one annular barrier flange formed in upstanding relationship on said upper surface and an annular groove formed on the underside of said cover and having said barrier flange disposed in nested relationship therein.

2. The manhole assembly of claim 1 wherein said flange has an inside diameter selected from the approximate range of from 6.0 ins. to 24.0 ins., a height above said upper surface selected from the approximate range of from 0.125 ins. to 0.50 ins., and a width selected from the approximately range of from 0.0625 ins. to 0.250 ins.

3. The manhole assembly of claim 1 wherein said upper surface is in part defined on an annular mounting flange extending radially outwardly from said body and said barrier flange.

4. The manhole assembly of claim 1 wherein said body comprises a member having a cylindrical sidewall and a bottom wall and an annular rim integrally secured to an upper end of said sidewall and having said barrier and said mounting flanges formed integrally thereon.

5. The manhole assembly of claim 4 further comprising stop means formed circumferentially in upstanding relationship on said mounting flange for delimiting lateral movement of said cover relative to said body.

6. The manhole assembly of claim 5 wherein said groove defines a centering flange on the underside and on a periphery of said cover and wherein said barrier flange and said stop means define a circumferential centering space radially therebetween, said centering flange disposed in said centering space.

7. The manhole assembly of claim 6 wherein said stop means comprises a plurality of upstanding and circumferentially spaced lugs formed on a radially outer edge of said mounting flange to define an opening between each circumferentially adjacent pair of lugs, a bottom of each said opening being defined by said upper surface.

8. The manhole assembly of claim 7 wherein each of said lugs has a generally triangularly shaped cross-section with an upstanding inner surface of said lug being disposed closely adjacent and in opposed relationship to an upstanding outer surface of said centering flange with the heights of said inner and outer surfaces being at least substantially co-terminus, an outer surface of said lug being tapered downwardly and outwardly from an upper edge of said outer surface to an outer edge of said inner surface.

9. The manhole assembly of claim 1 wherein each of said barrier flange and said groove has an at least approximate rectangular cross-section.

10. The manhole assembly of claim 1 wherein a plurality of said barrier flanges and a plurality of said grooves are formed on said upper surface and on the underside of said cover, respectively.

11. The manhole assembly of claim 1 further comprising means for attaching said body to a fill pipe for an underground storage tank and for maintaining a sealing relationship between said body and fill pipe when said fill pipe moves relative to said body.

12. The manhole assembly of claim 1 further comprising an upstanding fill pipe assembly adapted for attachment to an underground storage tank, said body attached to an upper end of said fill pipe assembly, an adapter secured to an upper end of said fill pipe assembly and a fill cap releasably attached on an upper end of said adapter.

13. The manhole assembly of claim 12 further comprising combined sealing and cushioning means for sealing a bottom wall of said body around said fill pipe assembly and for permitting universal movement of said fill pipe assembly relative to said body.

14. The manhole assembly of claim 13 wherein said combined sealing and cushioning means comprises at least one pair of first and second annular clamping plates surrounding said fill pipe assembly, an annular first elastomeric seal disposed axially between said first and second clamping plates, an annular second elastomeric seal disposed axially between said second clamping plate and the bottom wall of said body, and means for clamping said clamping plates and said seals together and to simultaneously extrude said seals radially inwardly into sealing engagement with said fill pipe assembly.

15. The manhole assembly of claim 12 further comprising means for draining liquid from said chamber to said fill pipe assembly.

16. A manhole assembly adapted for connection to a fill pipe for an underground storage tank comprising a member having an at least generally cylindrical sidewall and a bottom wall defining a chamber in said member, an annular cover removably mounted on said member, means defining an opening through said bottom wall for receiving a fill pipe assembly therethrough, and combined sealing and cushioning means secured to said bottom wall for attaching said member to said fill pipe assembly to seal said chamber and for permitting universal movement of said fill pipe assembly relative to said member, said combined sealing and cushioning means comprising a pair of clamping plates, a pair of elastomeric seals, and fastening means for compressing said clamping plates together, a first one of said elastomeric seals being disposed axially between said clamping plates and a second one of said elastomeric seals being disposed axially between one of said clamping plates and the bottom wall of said member and flange means formed on each said clamping plate for extruding a respective said elastomeric seal radially inwardly in response to tightening of said fastening means.

17. A manhole assembly adapted for connection to a fill pipe for an underground storage tank comprising a unitary and impervious hollow body comprising a body member having a cylindrical sidewall and a bottom wall defining a chamber therein, an annular rim secured to an upper end of said sidewall and terminating at an annular upper surface in part defined on an annular mounting flange extending radially outwardly from said body, an annular cover removably mounted in overlying relationship on said annular upper surface, a plurality of upstanding and circumferentially spaced lugs formed on a radially outer edge of said mounting flange to define an opening between each circumferentially adjacent pair of said lugs, a bottom of each said opening being defined by said upper surface, and dam means solely defined circumferentially, continuously and entirely between said upper surface and an underside of said cover for forming a barrier for preventing the ingress of liquid radially inwardly over said surface and into said chamber, said dam means comprising at least one annular barrier flange formed in upstanding relationship on said upper surface and at least one annular groove formed on the underside of said cover and having said barrier flange disposed in nested relationship therein, said groove defining an annular centering flange on said cover disposed in a circumferential centering space defined between said lugs and said barrier flange.

* * * * *